(12) United States Patent
Kirke

(10) Patent No.: US 8,965,337 B2
(45) Date of Patent: Feb. 24, 2015

(54) METHOD AND SYSTEM FOR DISCOVERING COMMUNICATION DEVICES

(75) Inventor: Tony Kirke, San Francisco, CA (US)

(73) Assignee: Broadcom Corporation, Irvine, CA (US)

(*) Notice: Subject to any disclaimer, the term of this patent is extended or adjusted under 35 U.S.C. 154(b) by 1553 days.

(21) Appl. No.: 11/422,640

(22) Filed: Jun. 7, 2006

(65) Prior Publication Data

US 2007/0287420 A1 Dec. 13, 2007

(51) Int. Cl.
| | |
|---|---|
| *H04M 1/66* | (2006.01) |
| *H04M 3/42* | (2006.01) |
| *H04B 7/00* | (2006.01) |
| *H04W 4/00* | (2009.01) |
| *H04L 29/12* | (2006.01) |
| *H04W 76/02* | (2009.01) |
| *H04M 1/725* | (2006.01) |
| *H04W 84/18* | (2009.01) |
| *H04W 92/02* | (2009.01) |
| *H04L 29/08* | (2006.01) |

(52) U.S. Cl.
CPC ...... *H04L 29/12113* (2013.01); *H04L 61/1541* (2013.01); *H04W 76/021* (2013.01); *H04M 1/7253* (2013.01); *H04W 84/18* (2013.01); *H04W 92/02* (2013.01); *H04L 67/16* (2013.01)
USPC ........... 455/411; 455/416; 455/41.2; 370/338

(58) Field of Classification Search
USPC .......................... 455/411, 416, 41.2; 370/338
See application file for complete search history.

(56) References Cited

U.S. PATENT DOCUMENTS

| | | | |
|---|---|---|---|
| 6,968,153 B1* | 11/2005 | Heinonen et al. ............ | 455/11.1 |
| 2005/0078608 A1* | 4/2005 | Gluck ........................... | 370/254 |
| 2007/0042758 A1* | 2/2007 | Bozzone ....................... | 455/413 |
| 2007/0104180 A1* | 5/2007 | Aizu et al. .................... | 370/352 |
| 2007/0115819 A1* | 5/2007 | Stephens et al. .............. | 370/230 |

* cited by examiner

*Primary Examiner* — Omoniyi Obayanju
(74) *Attorney, Agent, or Firm* — Garlick & Markison; Holly L. Rudnick

(57) ABSTRACT

Methods and systems for communicating information within a network are disclosed. The method may include receiving at a first wireless handheld communication device (WHCD), a communication signal from an intermediate communication device comprising at least one identifier (ID) of at least a second WHCD authorized to communicate with the intermediate communication device. The first WHCD may maintain a list of identifiers for authorized devices that are allowed to communicate with the first WHCD. The first WHCD need not be paired with any device that is specified by the list of identifiers for authorized devices maintained by the first WHCD. A communication link may be established between the first WHCD and the second WHCD via the intermediate communication device, if the list of identifiers for authorized devices maintained by the first WHCD comprises the ID of the second WHCD.

21 Claims, 12 Drawing Sheets

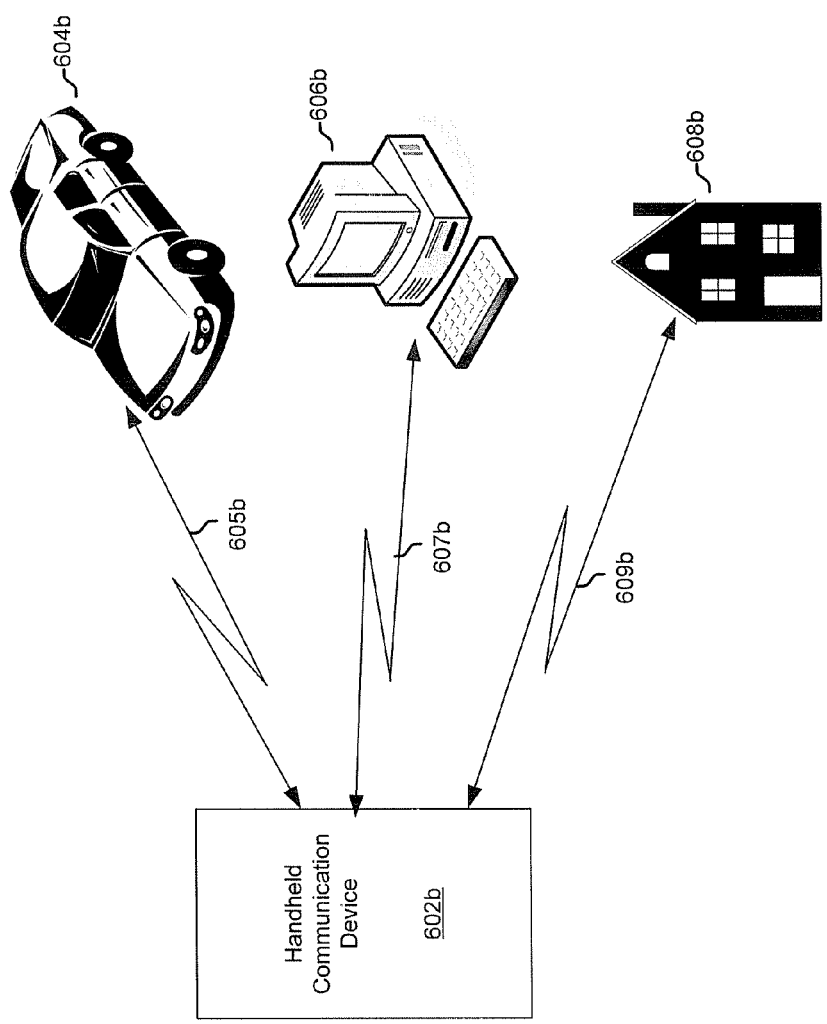

METHOD AND SYSTEM FOR DISCOVERING COMMUNICATION DEVICES

CROSS-REFERENCE TO RELATED APPLICATIONS/INCORPORATION BY REFERENCE

This application makes reference to:
U.S. patent application Ser. No. 11/422,637 filed on Jun. 7, 2006;
U.S. patent application Ser. No. 11/422,638 filed on Jun. 7, 2006;
U.S. patent application Ser. No. 11/422,645 filed on Jun. 7, 2006;
U.S. patent application Ser. No. 11/422,649 filed on Jun. 7, 2006;
U.S. patent application Ser. No. 11/422,657 filed on Jun. 7, 2006; and
U.S. patent application Ser. No. 11/422,664 filed on Jun. 7, 2006.

Each of the above stated applications is hereby incorporated herein by reference in its entirety.

FIELD OF THE INVENTION

Certain embodiments of the invention relate to communication of information within a network. More specifically, certain embodiments of the invention relate to a method and system for discovering communication devices.

BACKGROUND OF THE INVENTION

Wireless technology is revolutionizing personal connectivity by providing freedom from wired connections. Conventional wireless connectivity protocols for handheld communication devices, such as Bluetooth®, may provide a small form-factor, low-cost radio solution which may support links between computers, mobile phones and/or other portable and handheld communication devices. Bluetooth® wireless technology is an international, open standard for allowing intelligent devices to communicate with each other through wireless, short-range communications. The Bluetooth® technology allows a Bluetooth® compliant device, such as a Bluetooth®-enabled computer, computer mouse, computer keyboard, speakers, or a handheld communication device, for example, to support its own connections, without wires, cables or any direct action from a user. Bluetooth® is currently incorporated into numerous commercial products including laptops, PDAs, cell phones, keyboards, and printers, for example.

Bluetooth® handheld communication devices, such as mobile telephones and PDAs, are evolving to become more complex as such devices may be adapted to transmit and receive audio and/or video information. However, communicating data, such as audio and video data between Bluetooth®-enabled devices via a Bluetooth® connection requires increased power consumption and may be achieved at data rates that are slower than data rates offered by high-speed connections. Furthermore, conventional wireless connectivity standards for handheld communication devices, such as the Bluetooth® standard, are effective within a limited distance range. In addition, the Bluetooth® standard requires that Bluetooth®-enabled devices be paired prior to communication of information via a Bluetooth® link. Also paired Bluetooth®-enabled devices may communicate only at a limited distance, in most instances up to 10 meters.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for discovering communication devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 6B is a diagram illustrating exemplary use of a handheld communication device as a secure key, in accordance with an embodiment of the invention.

DETAILED DESCRIPTION OF THE INVENTION

Methods and systems for communicating information within a network are disclosed. The method may comprise receiving at a first wireless handheld communication device (WHCD), a communication signal from an intermediate communication device. The signal may comprise at least one identifier (ID) of at least a second WHCD authorized to communicate with the intermediate communication device. The first WHCD may maintain a list of identifiers for authorized devices that are allowed to communicate with the first WHCD. The first WHCD does not require pairing with any device that is specified by the list of identifiers for authorized devices maintained by the first WHCD. A communication link may be established between the first WHCD and the second WHCD via the intermediate communication device, if the list of identifiers for authorized devices maintained by the first WHCD comprises the ID of the second WHCD. The received ID of the second WHCD may be compared with identifiers in the list of identifiers for the authorized devices maintained by the first WHCD.

The communication link between the first WHCD and the second WHCD may be established using the intermediate communication device. The intermediate communication device may comprise a bridging function, a routing function, and/or a switching function. The intermediate communication device may also comprise a network server and/or a third WHCD. The communication link may be established between the first WHCD and the second WHCD utilizing the first WHCD and/or the second WHCD. The first WHCD may determine whether the second WHCD is within range of the intermediate communication device, prior to the establishing the communication link between the first WHCD and the second WHCD. A notification may be communicated by the first WHCD that the second WHCD is within range of the intermediate communication device, if the second WHCD is within range of the intermediate communication device.

Figure 1:
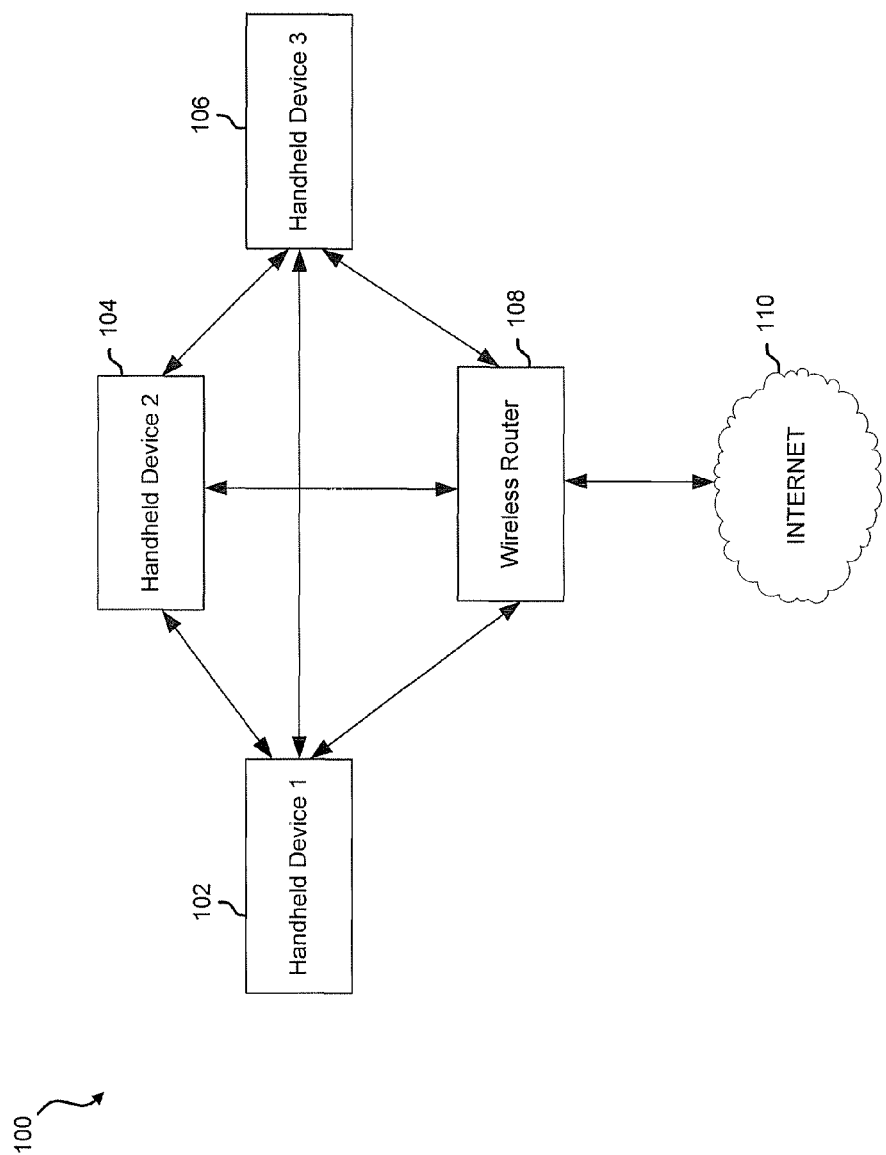
FIG. 1 is a diagram illustrating communication between a plurality of handheld communication devices in an ad-hoc network, in accordance with an embodiment of the invention.

FIG. 1 is a diagram illustrating communication between a plurality of handheld communication devices in an ad-hoc network, in accordance with an embodiment of the invention. Referring to FIG. 1, the ad-hoc network 100 may comprise a plurality of handheld communication devices, such as handheld communication devices 102, 104, and 106. The handheld communication devices 102, 104, and 106 may each comprise suitable circuitry, logic, and/or code and may communicate information wirelessly within the ad-hoc network 100. For example, handheld communication devices 102, 104, and 106 may communicate voice or data between each other over extended ranges, without the use of a network device, such as an access point, a base station, a bridge, a router, and/or a switch, for example, to facilitate such communication. The extended range may be much greater than the range provided by Bluetooth.

In one embodiment of the invention, handheld communication devices 102, 104, and 106 may utilize instant messaging (IM) to communicate data within the ad-hoc network 100. For example, during an initial formation of the ad-hoc network 100, the handheld communication device 102 may detect the presence of the handheld communication device 104. Handheld communication devices 102 and 104 may then exchange identification information related to the devices 102 and 104 and/or to the corresponding users of the devices 102 and 104. For example, handheld communication devices 102 and 104 may exchange user identification information. After handheld communication devices 102 and 104 exchange user identification information and authenticate each other, a connection may be established for a wireless exchange of data between the handheld communication devices 102 and 104. In one embodiment of the invention, the connection may be utilized to initiate a messaging session such as, for example, an instant messaging session between devices.

After an IM wireless connection is established between handheld communication devices 102 and 104, a third handheld communication device 106, located within operating range of handheld communication devices 102 and 104, may be detected by device 102 and/or device 104. After handheld communication device 106 is detected by handheld communication device 102 and/or handheld communication device 104, identification information may be exchanged between handheld communication device 106 and handheld communication devices 102 and 104. Handheld communication device 106 may then be accepted within the ad-hoc network 100 and IM communication may be established between handheld communication devices 102, 104, and 106.

In another embodiment of the invention, handheld communication devices 102, 104, and 106 may each communicate with the wireless router 108. The wireless router 108 may be communicatively coupled to the Internet 110. In this regard, one or more of the handheld communication devices 102, 104, and 106 may operate both within the ad-hoc network 100 and within an infrastructure network comprising, for example, the router 108 and one or more devices communicatively coupled to the Internet 110.

In yet another embodiment of the invention, one or more of the handheld communication devices 102, 104, 106 may generate a list of authorized devices that are allowed to communicate with the respective handheld communication device without pairing the handheld communication device with any device that is specified in the list of authorized devices.

The list of authorized devices may comprise device identification (ID) information for each of the authorized devices in the list. For example, handheld communication device 102 may generate a list of authorized devices that are allowed to communicate with the handheld communication device 102. The list of authorized devices may comprise, for example, handheld communication devices 104, 106, and the wireless router 108. Furthermore, the list of authorized devices may be generated by the handheld communication device 102 without pairing the handheld communication device 102 with any of the other communication devices 104, 106 and/or with the wireless router 108. The handheld communication device 102 may establish a communication link with one or more of the handheld communication devices listed on its authorized devices list, with or without the use of an intermediate communication device, such as a network device. The intermediate communication device may comprise a router, a switch, and/or an access point, for example.

Figure 2:
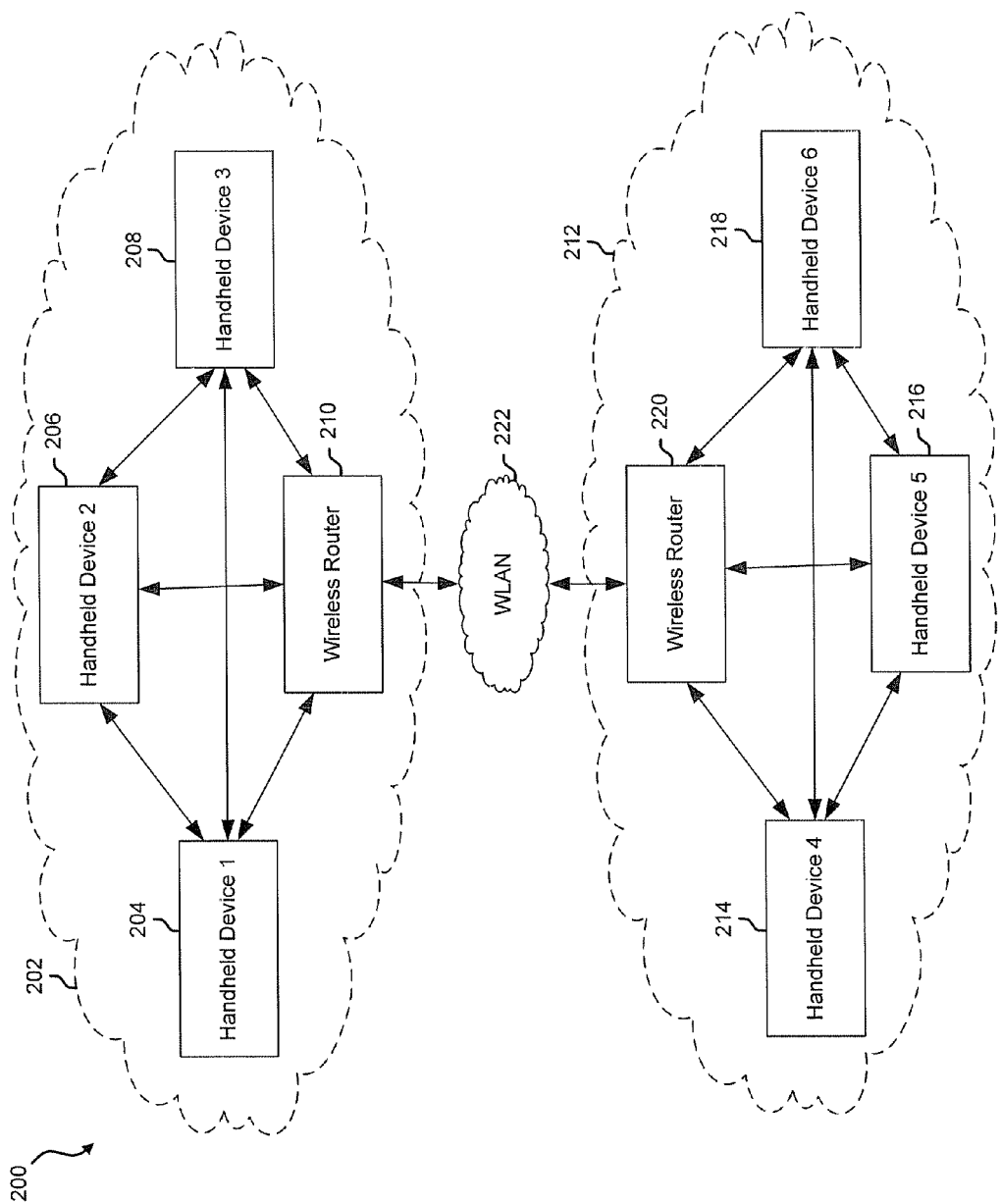
FIG. 2 is a diagram illustrating a plurality of ad-hoc networks comprising handheld communication devices, in accordance with an embodiment of the invention.

FIG. 2 is a diagram illustrating a plurality of ad-hoc networks comprising handheld communication devices, in accordance with an embodiment of the invention. Referring to FIG. 2, the communication infrastructure 200 may comprise ad-hoc networks 202 and 212. The ad-hoc network 202 may comprise a plurality of handheld communication devices, such as handheld communication devices 204, 206, and 208. The handheld communication devices 204, 206, and 208 may each comprise suitable circuitry, logic, and/or code and may communicate information wirelessly over an extended range within the ad-hoc network 202. For example, handheld communication devices 204, 206, and 208 may communicate voice or data between each other over extended ranges, without the use of a network device, such as an access point, a base station, a bridge, a router, and/or a switch, for example, to facilitate such communication. The extended range may be much greater than the range provided by Bluetooth.

Similarly, the ad-hoc network 212 may comprise a plurality of handheld communication devices, such as handheld communication devices 214, 216, and 218. The handheld communication devices 214, 216, and 218 may each comprise suitable circuitry, logic, and/or code and may communicate information wirelessly within the ad-hoc network 212. For example, handheld communication devices 214, 216, and 218 may communicate voice or data between each other over extended ranges, without the use of a network device, such as an access point, a base station, a bridge, a router, and/or a switch, for example, to facilitate such communication. The extended ranges may be much greater than the range provided by Bluetooth.

In one exemplary embodiment of the invention, handheld communication devices 204, 206, and 208 may utilize instant messaging (IM) to wirelessly communicate data over an extended range within the ad-hoc network 202 when the devices are within operating range of each other. Similarly, handheld communication devices 214, 216, and 218 may utilize, for example, instant messaging (IM) to communicate data within the ad-hoc network 212. One or more of the handheld communication devices 204, 206, and 208, within ad-hoc network 202, and handheld communication devices 214, 216, and 218, within ad-hoc network 212, may communicate with the wireless routers 210 and 220, respectively. The wireless routers 210 and 220 may be communicatively coupled to a wireless local area network (WLAN) 222. In this regard, one or more of the handheld communication devices 204, . . . , 208 may simultaneously communicate information to one or more handheld communication devices within the ad-hoc network 202, and to one or more handheld communication device within the ad-hoc network 212, via the wireless routers 210, 220 and the WLAN 222. Similarly, one or more of the handheld communication devices 214, . . . , 218 may communicate information within the ad-hoc network 212 and with one or more handheld communication device within the ad-hoc network 202, via the wireless routers 210, 220 and the WLAN 222.

Figure 3:
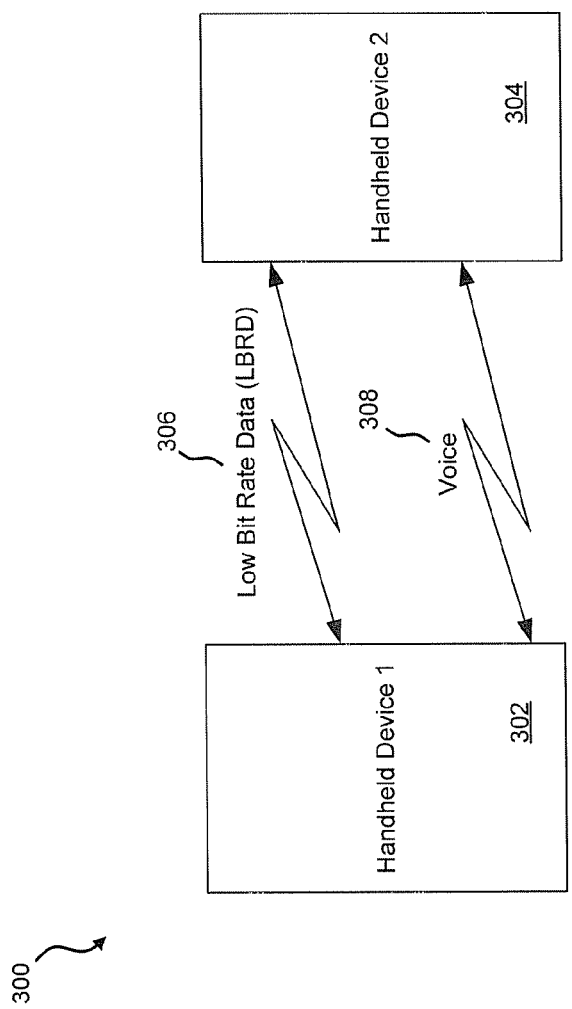
FIG. 3 is a diagram illustrating communication of information between handheld communication devices, in accordance with an embodiment of the invention.

FIG. 3 is a diagram illustrating communication of information between handheld communication devices, in accordance with an embodiment of the invention. Referring to FIG. 3, handheld communication devices 302 and 304 may form an ad-hoc network 300. In this regard, handheld communication devices 302 and 304 may exchange information without using an intermediate communication device, such as an access point, a base station, a bridge, a router, and/or a switch that facilitates communication between the handheld communication devices 302 and 304. The handheld communication devices 302 and 304 may comprise, for example, a cell phone or a personal digital assistant (PDA). Furthermore, the handheld communication devices 302 and 304 may communicate low bit-rate data (LBRD) 306 and/or voice data 308. The LBRD 306 may be exchanged during, for example, an instant messaging (IM) connection established between the handheld communication devices 302 and 304.

In operation, the handheld communication device 302 may detect the presence of the handheld communication device 304 when the latter is within operating range of the former. Handheld communication devices 302 and 304 may then exchange identification information related to the devices 302 and 304 and/or identification information related to the corresponding users of the devices 302 and 304. After handheld communication devices 302 and 304 exchange user identification information and authenticate each other, a connection may be established between handheld communication devices 302 and 304 for a wireless exchange of LBRD 306 and/or exchange of voice information 308.

Figure 4:
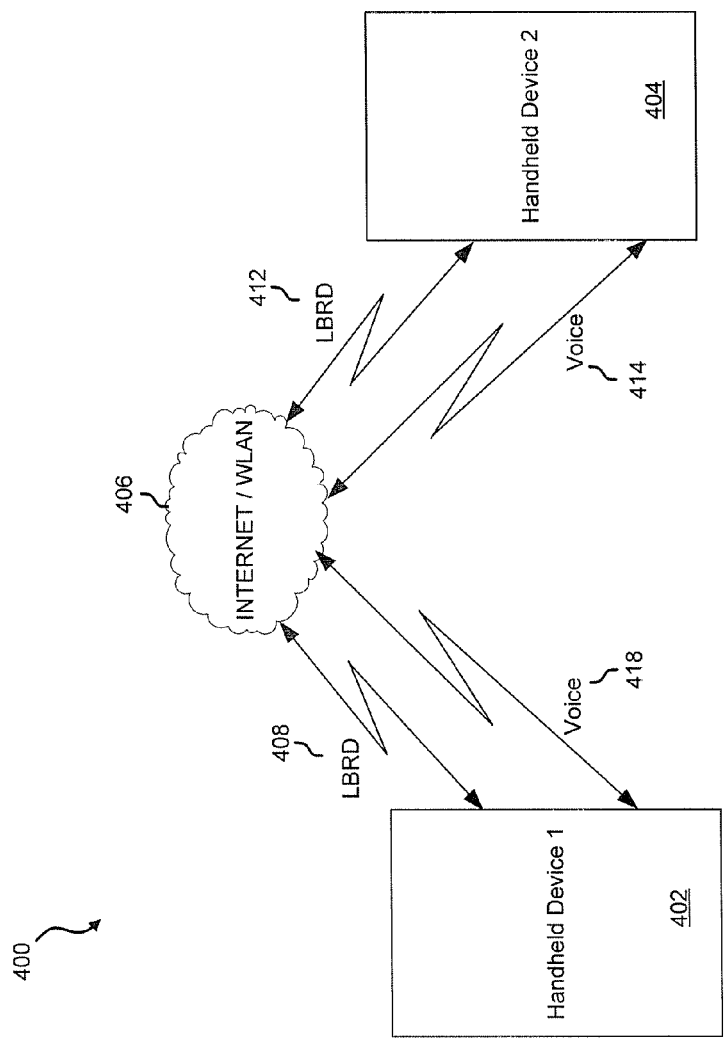
FIG. 4 is a diagram illustrating communication of information between handheld communication devices, in accordance with an embodiment of the invention.

FIG. 4 is a diagram illustrating communication of information between handheld communication devices, in accordance with an embodiment of the invention. Referring to FIG. 4, handheld communication devices 402 and 404 may form a communication infrastructure 400. The communication infrastructure 400 may also comprise the Internet or a WLAN 406. The handheld communication devices 402 and 404 may exchange information via the Internet or WLAN 406. The handheld communication devices 402 and 404 may comprise, for example, a cell phone or a personal digital assistant (PDA). Furthermore, the handheld communication devices 402 and 404 may communicate low bit-rate data (LBRD) 408 and 412 and/or voice data 418 and 414.

For example, LBRD 408 may be communicated between the Internet/WLAN 406 and the handheld communication device 402, and LBRD 412 may be communicated between the Internet/WLAN 406 and the handheld communication device 404. Similarly, voice data 418 may be communicated between the Internet/WLAN 406 and the handheld communication device 402, and voice data 414 may be communicated between the Internet/WLAN 406 and the handheld communication device 404. The LBRD 408 and 412 may be exchanged during, for example, an instant messaging (IM) connection established between the handheld communication devices 402 and 404 via the Internet/WLAN 406.

In operation, the handheld communication device 402 may detect the presence of the handheld communication device 404 via the Internet/WLAN 406. Handheld communication devices 402 and 404 may then exchange identification information related to the devices 402 and 404 and/or identification information related to the corresponding users of the handheld communication devices 402 and 404. After handheld communication devices 402 and 404 exchange user identification information and authenticate each other, a connection may be established between handheld communication devices 406 and 408 via the Internet/WLAN 406 for a wireless exchange of LBRD 408 and 412 and/or exchange of voice information 418 and 414.

In one embodiment of the invention, handheld communication device 402 may store identification information of handheld communication device 404, prior to pairing the devices 402 and 404 or prior to establishing any connection or communication between the devices 402 and 404 when the latter is within operating range of the former. In this regard, handheld communication device 404 may be "pre-authorized" to communicate with handheld communication device 402. In instances when handheld communication device 404 is pre-authorized for communication with handheld communication device 402, an ad-hoc network connection may be established between devices 402 and 404 at the time handheld communication device 402 detects handheld communication device 404.

Figure 5:
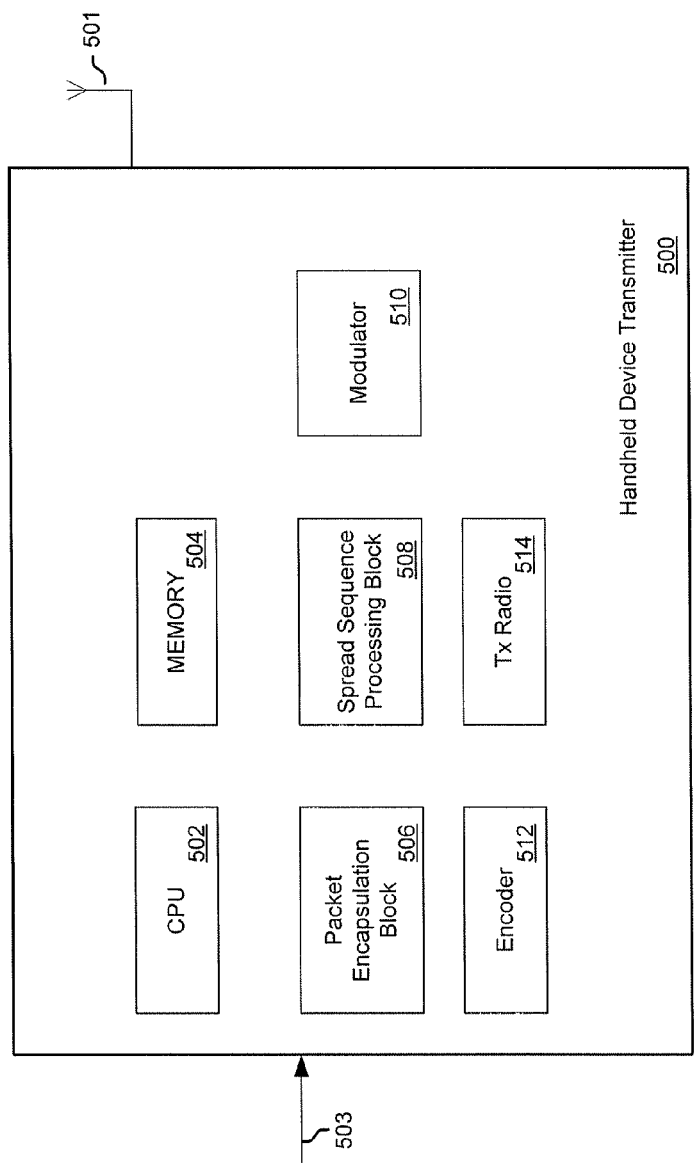
FIG. 5 is a block diagram of an exemplary handheld device transmitter, which may be utilized in accordance with an embodiment of the invention.

FIG. 5 is a block diagram of an exemplary handheld device transmitter, which may be utilized in accordance with an embodiment of the invention. Referring to FIG. 5, the exemplary handheld device transmitter 500 may comprise a CPU 502, memory 504, a packet encapsulation block 506, a spread sequence processing block 508, a modulator 510, an encoder 512, an antenna 501, and a transmit (Tx) radio 514.

The packet encapsulation block 506 may comprise suitable circuitry, logic, and/or code and may enable packetizing of the received data 503. For example, the packet encapsulation block 506 may insert protocol headers and/or device identification information within the received data 503. In one embodiment of the invention, the received data 503 may be initially encoded by the encoder 512, prior to packetization by the packet encapsulation block 506.

The spread sequence processing block 508 may comprise suitable circuitry, logic, and/or code and may utilize one or more spread sequences to process packetized data received from the packet encapsulation block 506. The modulator 510 may comprise suitable circuitry, logic, and/or code and may enable modulation of data processed by the spread sequence processing block 508. The Tx radio block 514 may comprise suitable circuitry, logic, and/or code and may enable transmission of modulated data via the antenna 501.

In operation, received data 503, such as voice data, may be initially encoded by the encoder 512. Encoded data may be packetized by the packet encapsulation block 506, thereby inserting protocol headers and/or device identification information. Packetized data may be processed by the spread sequence processing block 508 utilizing one or more spread sequences. Processed data may be communicated from the spread sequence processing block 508 to the modulator 510 for modulation. Modulated data may be transmitted by the Tx radio block 514 via the antenna 501.

In one embodiment of the invention, the device identification information inserted by the packet encapsulation block 506 may comprise information identifying a handheld device and/or a user of the handheld device. In this regard, the inserted device identification information may be used by one or more devices receiving the device identification information to establish a wireless connection and/or to perform a specific task based on authentication of the device identification information. For example, a first handheld device may communicate data comprising device identification information to a second handheld communication device. The second handheld communication device may then authorize the first handheld communication device based on the received device identification information.

Figure 6A:
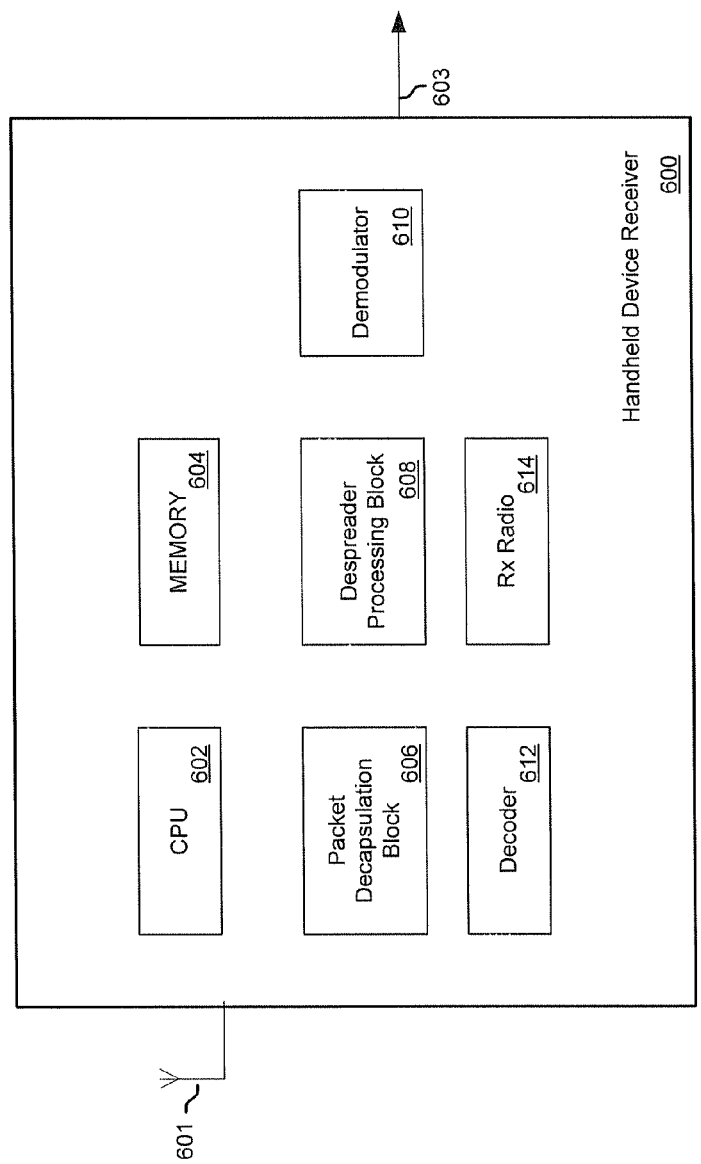
FIG. 6A is a block diagram of an exemplary handheld device receiver, which may be utilized in accordance with an embodiment of the invention.

FIG. 6A is a block diagram of an exemplary handheld device receiver, which may be utilized in accordance with an embodiment of the invention. Referring to FIG. 6A, the handheld device receiver may comprise a CPU 602, memory 504, a packet decapsulation block 606, a despreader processing block 608, a demodulator 610, a decoder 612, an antenna 601, and a receive (Rx) radio 614.

The demodulator 610 may comprise suitable circuitry, logic, and/or code and may enable demodulation of data received from the Rx radio block 614 via the antenna 601. The despreader processing block 608 may comprise suitable circuitry, logic, and/or code and may despread demodulated data received from the demodulator 610. The packet decapsulation block 606 may comprise suitable circuitry, logic, and/or code and may enable decapsulation despread data received from the despreader processing block 608. After decapsulation, protocol headers and/or device identification information may be obtained and the remaining data 603 may be communicated outside the handheld device receiver 600 for further processing.

FIG. 6B is a diagram illustrating exemplary use of a handheld communication device as a secure key, in accordance with an embodiment of the invention. Referring to FIG. 6B, the handheld communication device 602b may comprise a handheld device receiver, such as the handheld device receiver 600 in FIG. 6A. In addition, the handheld communication device 602b may comprise a handheld device transmitter, such as the handheld device transmitter 500 in FIG. 5.

In one embodiment of the invention, the vehicle 604b may comprise circuitry which may generate a list of authorized devices that are allowed to communicate with the vehicle 604b without pairing the vehicle 604b with any other device from the list of authorized devices. For example, the list of authorized devices maintained by the vehicle 604b may comprise devices that may be authorized to remotely unlock the vehicle 604b and/or to remotely start the vehicle 604b. In operation, the handheld communication device 602b may communicate device identification information 605b within transmitted data. If the list of authorized devices maintained by the vehicle 604b comprises handheld communication device 602b, the vehicle 604b may perform one or more functions, such as remote unlock and/or remote start, after the vehicle 604b receives the device identification information 605b.

In another embodiment of the invention, the personal computer (PC) 606b may comprise circuitry which may generate a list of authorized devices that are allowed to communicate with the PC 606b without pairing the PC 606b with any other device from the list of authorized devices. For example, the list of authorized devices maintained by the PC 606b may comprise devices that may be authorized to display information on a display connected to the PC 606b, and/or to utilize a different functionality of the PC 606b. In operation, the handheld communication device 602b may communicate device identification information 607b within transmitted data. If the list of authorized devices maintained by the PC 606b comprises handheld communication device 602b, the PC 606b may perform the desired functions, such as displaying information on a display connected to the PC 606b.

In yet another embodiment of the invention, the personal residence (PR) 608b may utilize circuitry which may generate a list of authorized devices that are allowed to communicate with the PR 608b without pairing the PR 608b with any other device from the list of authorized devices. For example, the list of authorized devices maintained by the PR 608b may comprise devices, or device users, that may be authorized to gain entry access, for example, to the PR 608b. In operation, the handheld communication device 602b may communicate device identification information 609b within transmitted data. If the list of authorized devices maintained by the PR 608b comprises handheld communication device 602b, the PR 608b may perform the desired functions, such as authorize entry access to the holder of the handheld communication device 602b. Such entry access may be granted after the PR 608b receives the device identification information 609b and authenticates the handheld communication device 602b.

Figure 6C:
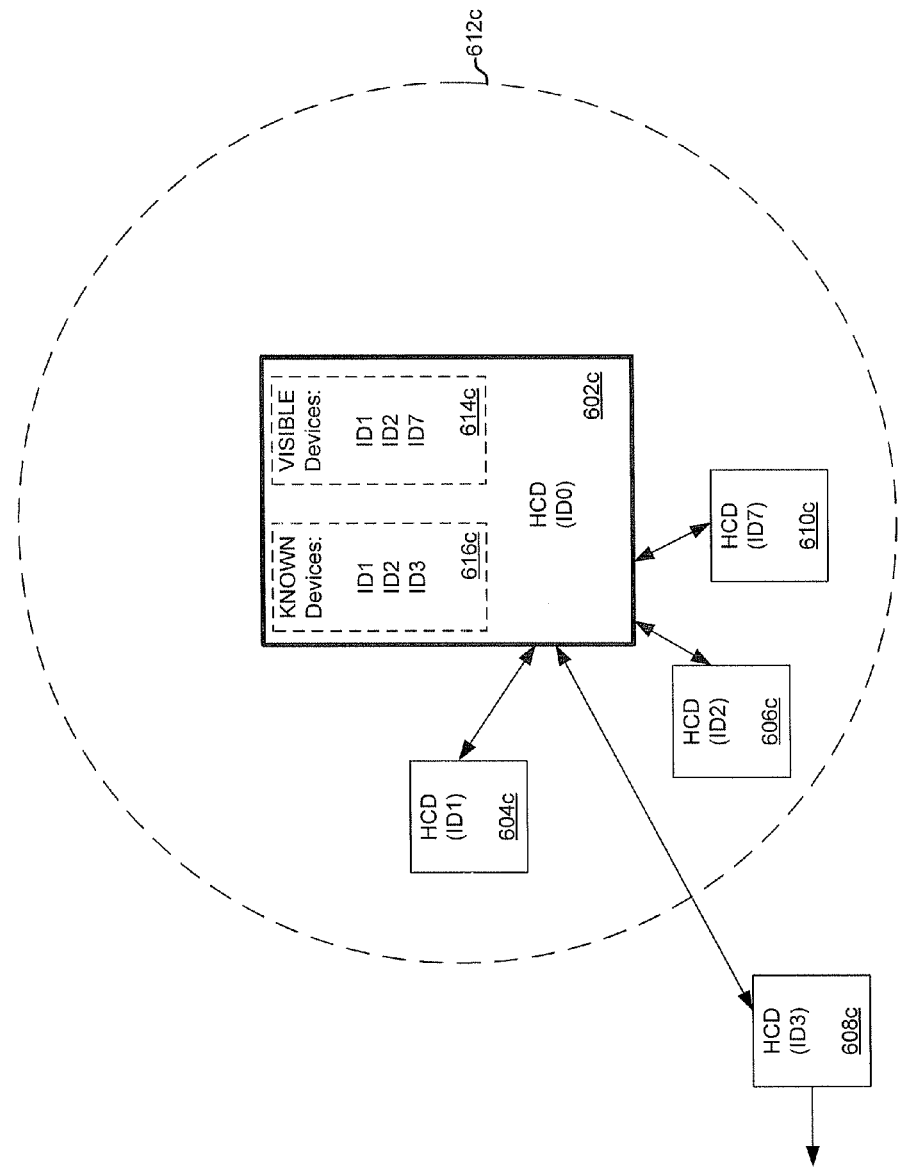
FIG. 6C is a diagram illustrating communication of information between or among a plurality of handheld communication devices, in accordance with an embodiment of the invention.

FIG. 6C is a diagram illustrating communication of information between or among a plurality of handheld communication devices, in accordance with an embodiment of the invention. Referring to FIG. 6C, there are illustrated a plurality of handheld communication devices 602c, . . . , 610c. Each of the plurality of handheld communication devices may comprise device identification (ID) information. For example, the handheld communication devices 602c, . . . , 610c may comprise device IDs, namely, ID0, ID1, ID2, ID3, and ID7, respectively.

In one embodiment of the invention, the handheld communication device 602c may detect the presence of at least one other compatible handheld communication device, such as handheld communication devices 604c, 606c, and 610c that are within operating range 612c of handheld communication device 602c. The detection of other compatible devices by the handheld communication device 602c may be achieved with or without the use of an intermediate communication device. Furthermore, the detection of other compatible devices by the handheld communication device 602c may be achieved with or without the use of a network infrastructure. The handheld communication device 602c may detect one or more of the handheld communication devices 604c, 606c, and 610c using one or more communication protocols that allow discovery of other devices that may be within operating range.

Once the handheld communication device 602c detects one or more other handheld communication devices that are within operating range of handheld communication device 602c, the handheld communication device 602c may generate a list of visible or detected devices 614c. For example, the list of visible or detected devices 614c may comprise device ID information ID1, ID2 and ID7 for handheld communication devices 604*c*, 606*c*, and 610*c*, respectively. In addition, the handheld communication device 602*c* may also maintain a list of known or authorized devices 616*c*. The list of known or authorized devices 616*c* may comprise device ID information for authorized devices that are allowed to communicate with the handheld communication device 602*c*. For example, the list of known or authorized devices 616*c* may comprise device ID information ID1, ID2, and ID3 corresponding to the handheld communication devices 604*c*, 606*c*, and 608*c*.

In another embodiment of the invention, an alerting feature may be activated for handheld communication device 602*c*, thereby indicating the presence of other devices located within operating range 612*c* of handheld communication device 602*c*. The alerting feature may generate an announcement at the handheld communication device 602*c*, and the announcement may comprise an audible and/or visual announcement. In addition, the alerting feature of handheld communication device 602*c* may be enabled or disabled. For example, whenever the alerting feature of handheld communication device 602*c* is enabled and handheld communication device 602*c* detects a new visible device within the operating range 612*c*, the list of visible or detected devices 614*c* may be updated and a notification may be communicated to the user of handheld communication device 602*c*. Such alerting feature may be used, for example, for notifying a first user, such as a taxi driver, that a second, previously known user, such as a client that has arrived at an airport, is within the vicinity of the first user, or the taxi driver. Various other device applications that require paging or notifying a first user when a previously known or unknown user is in the vicinity of the first user, may also be utilized.

Furthermore, the handheld communication device 602*c* may utilize one or more filtering criteria when communicating the notification. For example, if a new handheld communication device 610*c* is detected by the handheld communication device 602*c* within the operating range 612*c*, the list of visible or detected devices 614*c* may be updated. However, since the handheld communication device 610*c* is not on the list of known or authorized devices 616*c*, handheld communication device 602*c* may disregard the presence of the handheld communication device 610*c* within the operating range 612*c* and a notification may not be communicated by the handheld communication device 602*c*.

In another embodiment of the invention, the handheld communication device 602*c* may enable communication of notification when another handheld communication device listed on the list of visible or detected devices 614*c*, leaves the operating range 612*c*. For example, handheld communication device 608*c* may be listed in the list of known or authorized devices 616*c*. However, the handheld communication device 608*c*, which initially may be within the operating range 612*c* of the handheld communication device 602*c*, may move outside the operating range 612*c*. After the handheld communication device 608*c* moves outside the operating range 612*c*, the handheld communication device 602*c* may update the list of visible or detected devices 614*c* and remove device ID information ID3, associated with the handheld communication device 608*c*, from the list of visible or detected devices 614*c*. After the handheld communication device 608*c* leaves the operating range 612*c*, an audible or visible alarm notification may be communicated by the handheld communication device 602*c*. Such alerting feature may be used, for example, to notify a first user, such as a parent, that a second user, such as a child, has left the vicinity of the first user.

Even though lists 614*c* and 616*c* comprise device identification information, the present invention may not be so limited. In one embodiment of the invention, the list 616*c* may comprise identification information for known or authorized users, and list 614*c* may comprise identification information for visible or detected users.

Figure 6D:
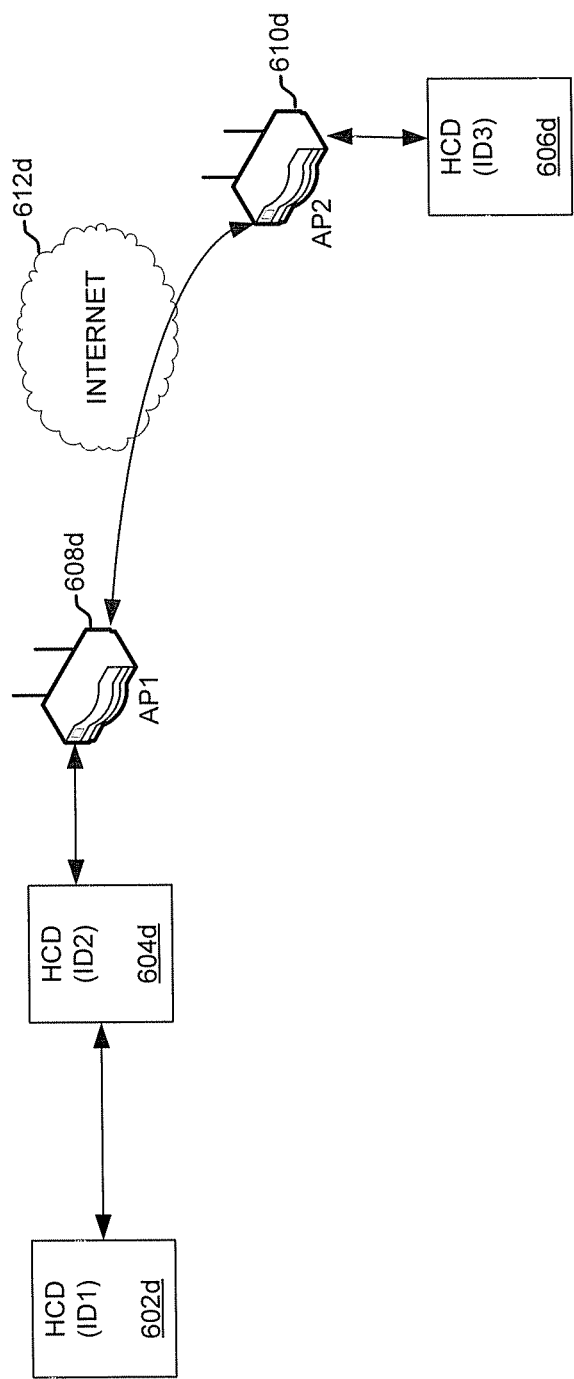
FIG. 6D is a diagram illustrating discovery and establishment of a communication link between or among a plurality of handheld communication devices, in accordance with an embodiment of the invention.

FIG. 6D is a diagram illustrating discovery and establishment of a communication link between or among a plurality of handheld communication devices, in accordance with an embodiment of the invention. Referring to FIG. 6D, there is illustrated communication of information between a plurality of handheld communication devices 602*d*, 604*d*, 606*d*, and a plurality of intermediate devices, such as access points 608*d* and 610*d*. Each of the plurality of handheld communication devices 602*d*, . . . , 606*d* may comprise device identification (ID) information. For example, the handheld communication devices 602*d*, . . . , 606*d* may comprise device IDs ID0, ID1, and ID2, respectively.

In one embodiment of the invention, a plurality of handheld communication devices that are out of each other's operating range, may discover each other and establish a communication link. For example, the handheld communication device 606*d* may be wirelessly connected to access point 610*d* within a first wireless local area network (WLAN). Similarly, the handheld communication device 604*d* may be wirelessly connected to access point 608*d* within a second WLAN. The access points 608*d* and 610*d* may be communicatively coupled via a communication link established using the Internet 612*d*. Furthermore, the handheld communication device 604*d* may be within the operating range of the handheld communication device 602*d*.

In operation, when the handheld communication device 604*d* is within the operating range of the handheld communication device 602*d*, the device ID information ID2 of the handheld communication device 604*d* may be included in the visible users list maintained by the handheld communication device 602*d*. In addition, the handheld communication device 602*d* may access the visible users list maintained by the handheld communication device 604*d*. In this regard, one or more device IDs from the visible users list of the handheld communication device 604*d* may be included in the visible users list maintained by the handheld communication device 602*d*.

For example, access point 608*d* and 610*d* may discover each other via the Internet 612*d*. Subsequently, the handheld communication devices linked to the access points 608*d* and 610*d* may also discover each other and establish a communication link via the access points 608*d*, 610*d* and the Internet 612*d*. In this regard, the handheld communication devices 604*d* and 606*d* may discover each other and may establish a communication link. The device identification information ID3 for the handheld communication device 606*d* may appear in the visible users list maintained by the handheld communication device 604*d*. Similarly, the device identification information ID2 for the handheld communication device 604*d* may appear in the visible users list maintained by the handheld communication device 606*d*. In this regard, after a communication link is established between the handheld communication devices 602*d* and 604*d*, and between the handheld communication devices 604*d* and 606*d*, the device identification information ID3 may be listed in the visible users list maintained by the handheld communication device 602*d*. Consequently, a communication link may be established between the handheld communication devices 602*d* and 606*d*, via the handheld communication device 604*d*, access points 608*d*, 610*d*, and the Internet 612*d*.

Figure 7:
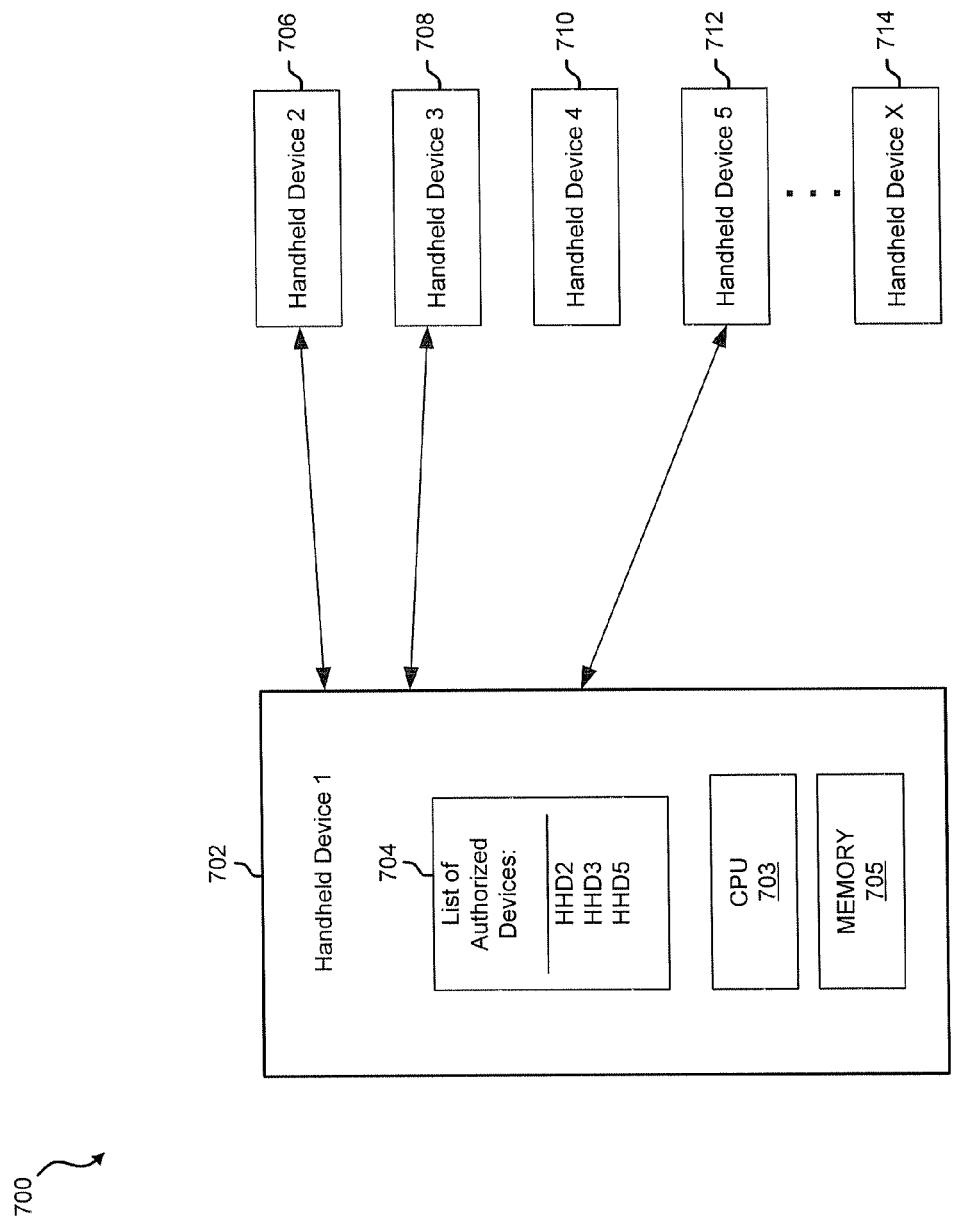
FIG. 7 is a diagram of a handheld communication device in an ad-hoc network utilizing a list of authorized devices, in accordance with an embodiment of the invention.

FIG. 7 is a diagram of a handheld communication device in an ad-hoc network utilizing a list of authorized devices, in accordance with an embodiment of the invention. Referring to FIG. 7, the ad-hoc network 700 may comprise handheld communication devices 702, 706, ..., 714. The handheld communication devices 702, 706, ..., 714 may each comprise suitable circuitry, logic, and/or code and may communicate information wirelessly within the ad-hoc network 700. For example, handheld communication devices 702, 706, ..., 714 may communicate voice or data between each other over extended ranges, without the use of a network device, such as an access point, a base station, a bridge, a router, and/or a switch to facilitate such communication. The extended range may be much greater than the range provided by Bluetooth.

In one embodiment of the invention, the handheld communication device 702 may comprise a CPU 703 and memory 705. The CPU 703 may enable communication of LBRD or voice data, for example, between handheld communication device 702 and one or more handheld communication devices within the ad-hoc network 700. Furthermore, the handheld communication device 702 may maintain a list of authorized devices 704. The list of authorized devices 704 may be stored within the memory 705. In addition, the list of authorized devices 704 may comprise identification information of one or more additional handheld communication devices that may be "pre-authorized" to communicate with the handheld communication device 702, prior to pairing the additional devices with the handheld 702 or prior to establishing any connection or communication between the additional devices and the handheld communication device 702. In instances when a handheld communication device is pre-authorized for communication with handheld communication device 702, an ad-hoc network connection may be established between the pre-authorized handheld communication device and device 702 at the time handheld communication device 702 detects the pre-authorized handheld communication device.

For example, the list of authorized devices 704 may comprise identification information for handheld communication devices 706, 708, and 712. If one or more of the additional handheld communication devices 706, ..., 714 are within an operating range of handheld communication device 702, handheld communication device 702 may detect the additional devices and may receive identification information from the detected handheld communication devices. For example, handheld communication device may detect that handheld communication devices 706, ..., 712 are within its operating range. Handheld communication devices 706, ..., 712 may then communicate identification information to handheld communication device 702. The handheld communication device 702 may then match the received identification information with identification information of "pre-authorized" devices stored within the list of authorized devices 704. Since only handheld communication devices 706, 708, and 712 are pre-authorized, handheld communication device 702 may establish a connection with handheld communication devices 706, 708, and 712. The handheld communication device 702 may deny connection with the handheld communication device 710. In such instance, the handheld communication device 710 may be notified of the denied connection via a text message, for example.

Figure 8:
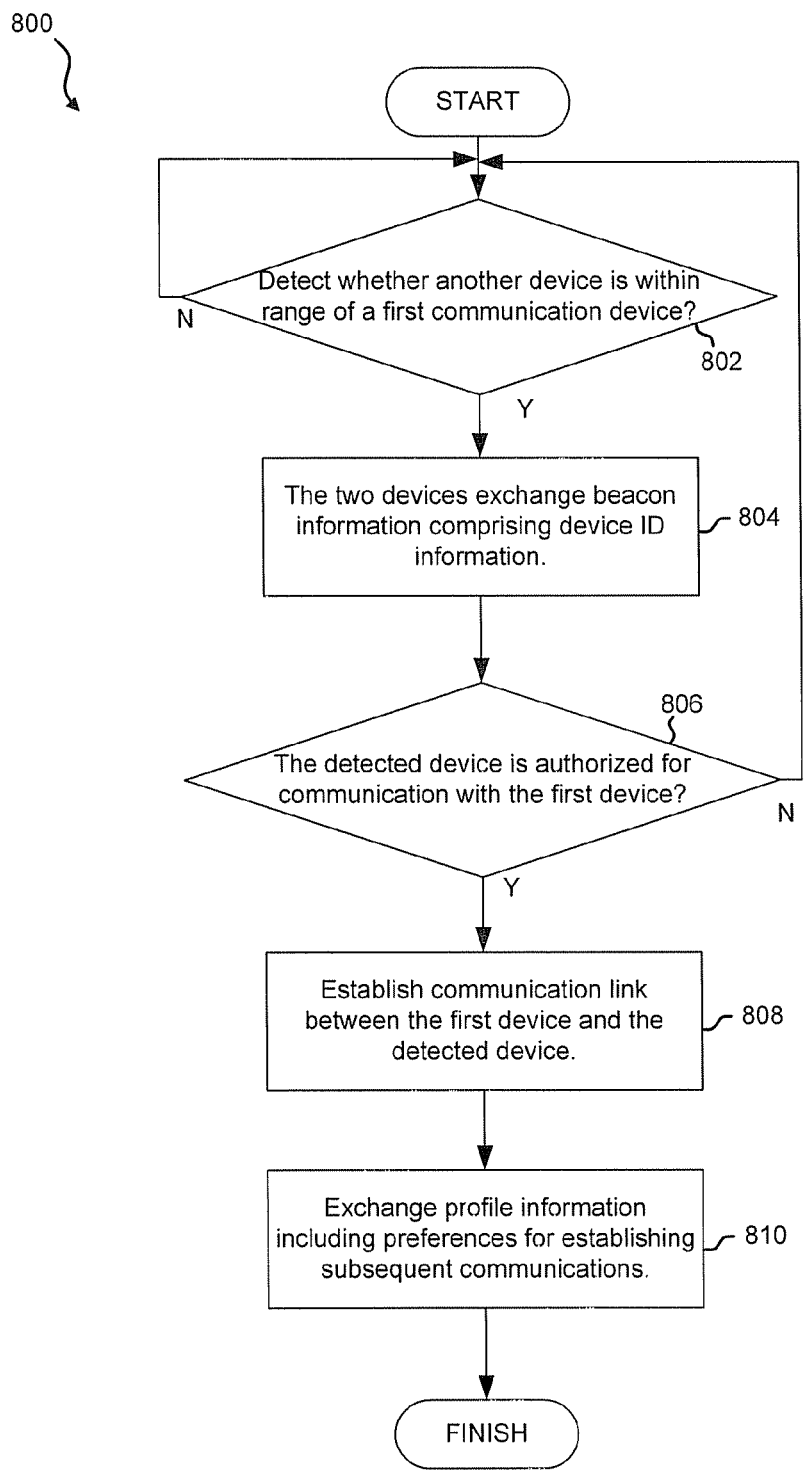
FIG. 8 is a flowchart illustrating exemplary steps for communicating information within a network, in accordance with an embodiment of the invention.

FIG. 8 is a flowchart 800 illustrating exemplary steps for communicating information within a network, in accordance with an embodiment of the invention. Referring to FIGS. 7 and 8, at 802, the handheld communication device 702 may detect whether another handheld communication device is within operating range of the handheld communication device 702. If another handheld communication device, for example handheld communication device 706, is within operating range of the handheld communication device 702, at 804, handheld communication devices 702 and 706 may exchange beacon information, such as device identification information. At 806, the handheld communication device 702 may determine whether the handheld communication device 706 is authorized to communicate with the handheld communication device 702. For example, handheld communication device 702 may match the identification information received from the handheld communication device 706 with identification information stored within the list of authorized devices 704.

If the handheld communication device 706 is not authorized for communicating information with the handheld communication device 702, operation may resume at step 802. If the handheld communication device 706 is authorized for communicating information with the handheld communication device 702, at 808, a communication link may be established between the handheld communication devices 702 and 706. The established communication link may be used to communicate LBRD and/or voice data, for example, between handheld communication devices 702 and 706, without the assistance of an intermediate communication device that comprises a bridging function, a routing function, and/or a switching function. At 810, profile information may be exchanged between the handheld communication devices 702 and 706. The profile information may comprise, for example, preferences for establishing and maintaining subsequent communications, such as preferred time of day and preferred type of information to be exchanged.

Figure 9:
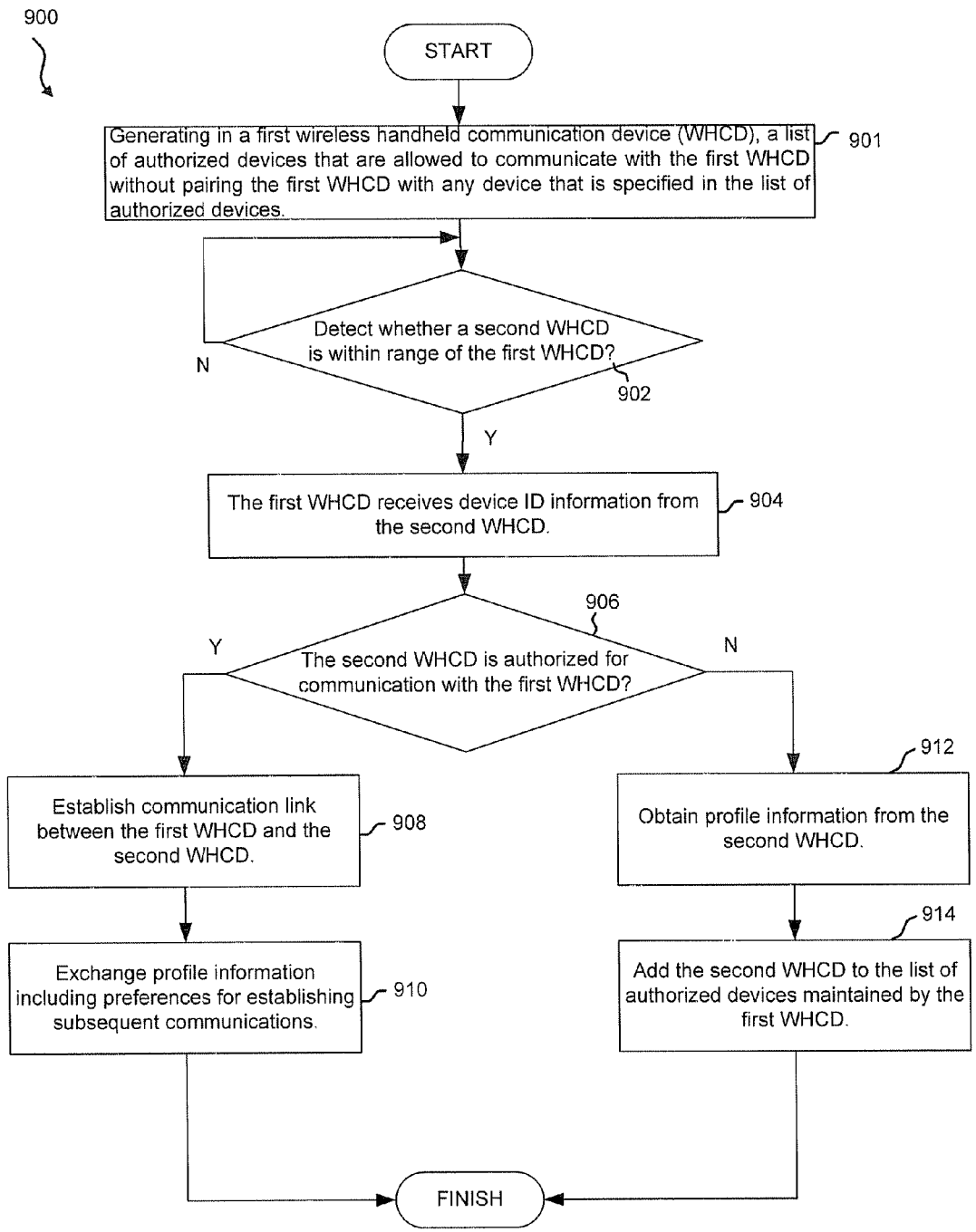
FIG. 9 is a flowchart illustrating exemplary steps for communicating information within a network, in accordance with an embodiment of the invention.

FIG. 9 is a flowchart 900 illustrating exemplary steps for communicating information within a network, in accordance with an embodiment of the invention. Referring to FIGS. 7 and 9, at 901, the first wireless handheld communication device 702 may generate a list 704 of authorized devices that are allowed to communicate with the first wireless handheld communication device 702 without pairing the first wireless handheld communication device 702 with any device that is specified in the list 704 of authorized devices. At 902, the first wireless handheld communication device 702 may detect whether the second wireless handheld communication device, selected from the available wireless handheld communication devices 706, ..., 714 is within operating range of the first wireless handheld communication device 702.

If one or more of the wireless handheld communication devices 706, ..., 714, for example the wireless handheld communication device 706, is within operating range of the first wireless handheld communication device 702, at 904, the first wireless handheld communication device 702 may receive device ID information from the second wireless handheld communication device 706. At 906, the first wireless handheld communication device 702 may determine whether the second wireless handheld communication device 706 is authorized to communicate information with the first wireless handheld communication device 702. For example, the first wireless handheld communication device 702 may match the identification information received from the second wireless handheld communication device 706 with identification information stored within the list of authorized devices 704.

If the second wireless handheld communication device 706 is authorized to communicate with the first wireless handheld communication device 702, at 908, a communication link may be established between the wireless handheld communication devices 702 and 706. At 910, after a communication link is established between the wireless handheld communication devices 702 and 706, profile information may be exchanged between the wireless handheld communication devices 702 and 706. The profile information may comprise, for example, preferences for establishing and maintaining subsequent communications, such as preferred time of day and preferred type of information to be exchanged.

If the second wireless handheld communication device 706 is not authorized to communicate information with the first wireless handheld communication device 702, at 912, the first wireless handheld communication device 702 may request and obtain profile information from the second wireless handheld communication device 706. At 914, after the first wireless handheld communication device 702 receives profile information from the second wireless handheld communication device 706 and the second wireless handheld communication device 706 is approved to communicate with the first wireless handheld communication device 702, the first wireless handheld communication device 702 may add the second wireless handheld communication device 706 to the list of authorized devices 704.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for communicating information within a network, the method comprising:

receiving at a first wireless handheld communication device (WHCD), a communication signal from an intermediate communication device, the communication signal comprising at least one identifier (ID) of at least a second WHCD authorized to communicate with said intermediate communication device, wherein said first WHCD maintains a list of identifiers for authorized devices that are allowed to communicate with said first WHCD and wherein said first WHCD is not in a direct communication link with said second WHCD via a network;

and if said list of identifiers for authorized devices maintained by said first WHCD comprises said at least one ID of said at least said second WHCD, establishing an indirect communication link between said first WHCD and said at least said second WHCD via said intermediate communication device, by establishing a communication link between said first WHCD and said intermediate communication device, and between said intermediate communication device and said second WHCD;

wherein said intermediate communication device comprises a network server.

2. The method according to claim 1, comprising comparing said received at least one ID of said at least said second WHCD with identifiers in said list of identifiers for said authorized devices maintained by said first WHCD.

3. The method according to claim 1, comprising establishing said communication link between said first WHCD and said at least said second WHCD using said intermediate communication device.

4. The method according to claim 1, comprising establishing said communication link between said first WHCD and said at least said second WHCD utilizing said first WHCD.

5. The method according to claim 1, comprising establishing said communication link between said first WHCD and said at least second WHCD utilizing said at least said second WHCD.

6. The method according to claim 1, comprising determining whether said at least said second WHCD is within range of said intermediate communication device, prior to said establishing said communication link between said first WHCD and said at least said second WHCD.

7. The method according to claim 6, comprising, if said at least said second WHCD is within range of said intermediate communication device, communicating a notification by said first WHCD that said at least said second WHCD is within range of said intermediate communication device.

8. A non-transitory computer-readable medium having stored thereon, a computer program having at least one code section for communicating information within a network, the at least one code section being executable by a computer for causing the computer to perform steps comprising:

receiving at a first wireless handheld communication device (WHCD), a communication signal from an intermediate communication device, the communication signal comprising at least one identifier (ID) of at least a second WHCD authorized to communicate with said intermediate communication device, wherein said first WHCD maintains a list of identifiers for authorized devices that are allowed to communicate with said first WHCD and wherein said first WHCD is not in a direct communication link with said second WHCD via a network; and if said list of identifiers for authorized devices maintained by said first WHCD comprises said at least one ID of said at least said second WHCD, establishing an indirect communication link between said first WHCD and said at least said second WHCD via said intermediate communication device, by establishing a communication link between said first WHCD and said intermediate communication device, and between said intermediate communication device and said second WHCD;

wherein said intermediate communication device comprises a network server.

9. The non-transitory computer-readable medium according to claim 8, comprising code for comparing said received at least one ID of said at least said second WHCD with identifiers in said list of identifiers for said authorized devices maintained by said first WHCD.

10. The non-transitory computer-readable medium according to claim 8, comprising code for establishing said communication link between said first WHCD and said at least said second WHCD using said intermediate communication device.

11. The non-transitory computer-readable medium according to claim 8, comprising code for establishing said communication link between said first WHCD and said at least said second WHCD utilizing said first WHCD.

12. The non-transitory computer-readable medium according to claim 8, comprising code for establishing said communication link between said first WHCD and said at least second WHCD utilizing said at least said second WHCD.

13. The non-transitory computer-readable medium according to claim 8, comprising code for determining whether said at least said second WHCD is within range of said intermediate communication device, prior to said establishing said communication link between said first WHCD and said at least said second WHCD.

14. The non-transitory computer-readable medium according to claim 13, comprising code for communicating a notification by said first WHCD that said at least said second WHCD is within range of said intermediate communication device, if said at least said second WHCD is within range of said intermediate communication device.

15. A system for communicating information within a network, the system comprising:

at least one processor for use within a first wireless handheld communication device (WHCD), the at least one processor enables receiving by said first WHDC of a communication signal from an intermediate communication device, the communication signal comprising at least one identifier (ID) of at least a second WHCD authorized to communicate with said intermediate communication device, wherein said first WHCD maintains a list of identifiers for authorized devices that are allowed to communicate with said first WHCD and wherein said first WHCD is not in a direct communication link with said second WHCD via a network; and said at least one processor enables establishing of an indirect communication link between said first WHCD and said at least said second WHCD via said intermediate communication device, if said list of identifiers for authorized devices maintained by said first WHCD comprises said at least one ID of said at least said second WHCD, by establishing a communication link between said first WHCD and said intermediate communication device, and between said intermediate communication device and said second WHCD;

wherein said intermediate communication device comprises a network server.

16. The system according to claim 15, wherein said at least one processor enables comparing of said received at least one ID of said at least said second WHCD with identifiers in said list of identifiers for said authorized devices maintained by said first WHCD.

17. The system according to claim 15, wherein said at least one processor enables establishing of said communication link between said first WHCD and said at least said second WHCD using said intermediate communication device.

18. The system according to claim 15, wherein said at least one processor enables establishing of said communication link between said first WHCD and said at least said second WHCD utilizing said first WHCD.

19. The system according to claim 15, wherein said at least one processor enables establishing of said communication link between said first WHCD and said at least second WHCD utilizing said at least said second WHCD.

20. The system according to claim 15, wherein said at least one processor enables determining of whether said at least said second WHCD is within range of said intermediate communication device, prior to said establishing said communication link between said first WHCD and said at least said second WHCD.

21. The system according to claim 20, wherein said at least one processor enables communication of a notification by said first WHCD that said at least said second WHCD is within range of said intermediate communication device, if said at least second WHCD is within range of said intermediate communication device.

* * * * *